United States Patent
Dare et al.

(10) Patent No.: US 7,946,255 B2
(45) Date of Patent: May 24, 2011

(54) ANTI-CRIBBING HORSE COLLAR

(75) Inventors: Russell Whilden Dare, Hamilton, OH (US); Mitchell Doran Schutz, N Manchester, IN (US); Lowell Knicely Heatwole, New Paris, IN (US)

(73) Assignee: Schutz Brothers Inc., North Manchester, IN (US)

( * ) Notice: Subject to any disclaimer, the term of this patent is extended or adjusted under 35 U.S.C. 154(b) by 140 days.

(21) Appl. No.: 12/319,503

(22) Filed: Jan. 8, 2009

(65) Prior Publication Data
US 2010/0170451 A1    Jul. 8, 2010

(51) Int. Cl.
*A01K 15/04* (2006.01)

(52) U.S. Cl. .......................... 119/821; 119/814

(58) Field of Classification Search ............... 119/814, 119/815, 521, 828, 855, 826, 862, 863, 864, 119/719, 758, 763, 762, 760, 759, 761, 765, 119/766, 768, 817, 820, 822, 823, 829, 831
See application file for complete search history.

(56) References Cited

U.S. PATENT DOCUMENTS

| | | | |
|---|---|---|---|
| 66,375 A * | 7/1867 | Metcalfe ............... | 119/829 |
| 78,155 A | 5/1868 | Sullivan | |
| 84,687 A | 12/1868 | Force et al. | |
| 131,925 A | 10/1872 | Wright | |
| 195,667 A * | 9/1877 | Snead et al. ............... | 119/821 |
| 417,878 A * | 12/1889 | Meyer ............... | 119/821 |
| 420,054 A | 1/1890 | Gowan | |
| 439,598 A * | 10/1890 | Huntoon et al. ............... | 119/815 |
| 645,343 A * | 3/1900 | Weller et al. ............... | 54/80.5 |
| 865,808 A | 9/1907 | Knight et al. | |
| 1,184,643 A * | 5/1916 | Hartman ............... | 54/24 |
| 1,603,222 A | 10/1926 | Transue | |
| 2,313,833 A | 3/1943 | Marmet | |
| 2,669,816 A | 2/1954 | Pletsch | |
| 2,941,507 A | 6/1960 | Becker et al. | |
| 3,024,767 A | 3/1962 | Des Roches | |
| 3,687,112 A | 8/1972 | Henderson | |
| 4,141,199 A * | 2/1979 | Doino, Jr. ............... | 54/80.3 |
| 5,343,829 A | 9/1994 | Lookingbill | |
| 5,460,125 A | 10/1995 | Lookingbill | |
| 7,036,460 B2 | 5/2006 | Ducharme et al. | |
| 7,124,713 B2 | 10/2006 | Van Breemen | |

* cited by examiner

*Primary Examiner* — Joshua J Michener
*Assistant Examiner* — Joshua Huson
(74) *Attorney, Agent, or Firm* — George Pappas

(57) ABSTRACT

An anti-cribbing collar for a horse. The collar includes an elongate rigid member defining a longitudinal axis. The collar includes at least one elongate flexible support member having a front edge and a rear edge and which defines a majority of the collar's circumferential length. The rigid member is positionable proximate a lower jaw depression and throat of the horse with its longitudinal axis extending in a generally front-to-back direction. The flexible support member extends laterally outwardly with respect to the longitudinal axis proximate an intermediate longitudinal location on the rigid member and the first end of the rigid member projects forwardly of the front edge of the flexible support member and the second end of the rigid member projects rearwardly of the rear edge of the flexible support member. A portion of the rigid member is positioned below a tensile loop defined by the collar.

20 Claims, 4 Drawing Sheets

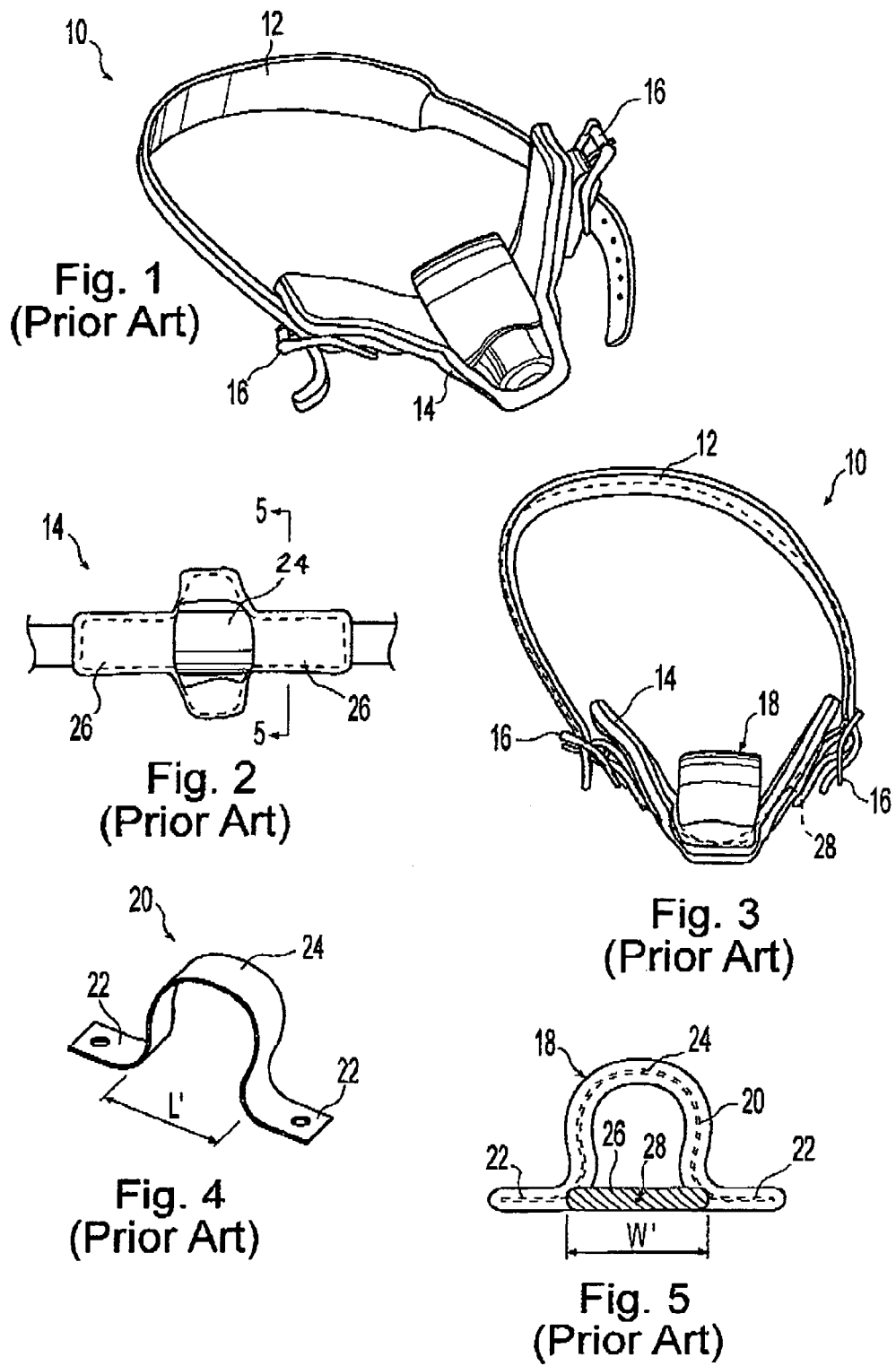

ANTI-CRIBBING HORSE COLLAR

BACKGROUND OF THE INVENTION

1. Field of the Invention

The present invention relates to devices for deterring a horse from undesirable behaviors commonly known as "cribbing" and "wind-sucking" and, more particularly, to a collar for deterring such behaviors.

2. Description of the Related Art

Cribbing and wind-sucking are terms that are commonly used to describe related and undesirable behaviors that afflict many horses. These two behaviors are collectively referred to as "cribbing" hereinafter. A horse which suffers from this form of behavior will oftentimes press down on an object with its upper teeth and arch its neck while swallowing air. Individual horses will often vary one or more aspects of this behavior. For example, some horses will arc their neck and swallow air without pressing their teeth on any object. This type of behavior can negatively impact the health of the horse by causing excessive tooth wear and by generating health problems associated with the ingestion of large quantities of air. For example, it is thought that the ingestion of air in such a manner can lead to stomach convulsions, entangled intestines or a loss of appetite resulting in underperformance or undernourishment.

The causes of cribbing are not fully understood but likely differ for individual horses. Some of the factors that are thought to be contributors to this type of behavior are stress, boredom, confinement for extended periods of time and copying of other horses. It is theorized that cribbing releases various pleasure inducing brain chemicals and becomes an addictive habit and cribbing behavior in horses is often described as an equine equivalent to obsessive compulsive disorders found in humans.

Various methods and devices have been developed to discourage this form of behavior. Some of these devices take the form of collars having a feature that engages the throat area of the horse. FIGS. 1-5 illustrate one example of a known anti-cribbing collar 10. Collar 10 includes an upper strap 12 that is connected to a lower portion 14 with two opposing buckles 16. The lower portion 14 includes a semi-circular projection 18 that is formed by wrapping a metal clamp 20 (FIG. 4) with leather. Metal clamp 20 includes forward and rear flanges 22 located on opposite sides of semi-circular projection 24. Lower portion 14 includes two lower straps 26 that extend away from the centrally located semi-circular projection 18. Lower straps 26 have a width that is substantially equivalent to the distance between the forward and rear flanges 22 of clamp 20. In other words the width (W') of straps 26 is substantially equivalent to the length (L') of the upwardly projecting semi-circular projection 18.

In use, lower portion 14 is positioned so that projection 18 fits in the horse "throat latch" generally defined as the area between the neck and head/lower jaw bones and generally within the depression between the two lower jaw bones of the horse. Upper strap 12 wraps around the top of the neck and/or on top of the head of the horse to secure lower portion 14 in place. When collar 10 is mounted on the horse, it forms a loop through which tensile forces can be transmitted. Dashed lines 28 schematically depict this tensile loop with projection 18 being disposed within the interior of loop 28. As shown in FIG. 3, the dashed lines depicting the tensile loop extend through the upper strap 12, buckles 16 and lower straps 26. When a horse wearing anti-cribbing collar 10 attempts to crib or ingest air, projection 18 interferes with the full opening of the air passage of the horse to thereby discourage such behavior.

While collar 10 and other known devices which are intended to discourage cribbing have been successful with some horses in deterring such behavior, such known devices do not work with all horses and the prevention of cribbing in horses remains a significant problem. Accordingly, there remains a need for a device that can discourage cribbing behavior in horses without harming the animal.

SUMMARY OF THE INVENTION

The present invention provides an anti-cribbing horse collar that provides an effective deterrent to cribbing behavior and which is less likely to cause discomfort to the horse when the horse is not engaging in cribbing behavior.

The invention comprises, in one form thereof, an anti-cribbing collar mountable on a horse wherein the collar includes an elongate rigid member supported on the collar and having first and second opposed ends and defining a longitudinal axis. The collar has a circumferential length and is adapted to encircle a portion of the horse. The collar includes at least one elongate flexible support member having a front edge and a rear edge and which defines a majority of the circumferential length. The rigid member is positionable proximate a lower jaw depression and throat of the horse with the longitudinal axis extending in a generally front-to-back direction with respect to the horse when the collar is mounted on the horse. The at least one flexible support member extends laterally outwardly with respect to the longitudinal axis proximate an intermediate longitudinal location on the rigid member and the first end of the rigid member projects forwardly of the front edge of the at least one flexible support member proximate the rigid member and the second end of the rigid member projects rearwardly of the rear edge of the at least one flexible support member proximate the rigid member.

The invention comprises, in another form thereof, an anti-cribbing collar mountable on a horse wherein the collar includes an elongate rigid member supported on the collar. The rigid member has first and second opposed ends and defines a longitudinal axis. The collar is adapted to encircle a portion of the horse and has a circumferential length and defines a tensile loop. The collar also includes at least one elongate flexible support member wherein the at least one flexible support member defines a majority of the circumferential length. The rigid member is positionable proximate a lower jaw depression and throat of the horse with the longitudinal axis extending in a generally front-to-back direction with respect to the horse when the collar is mounted on the horse. The longitudinal axis of the rigid member is positioned generally transverse to a plane defined by the tensile loop and a longitudinal segment of the rigid member nearest the tensile loop is disposed at least partially exterior of the tensile loop whereby the longitudinal segment of the rigid member is positioned at least partially below the tensile loop when the collar is mounted on the horse.

The invention comprises, in yet another form thereof, an anti-cribbing collar mountable on a horse wherein the collar includes an elongate rigid member having first and second opposed ends and defining a longitudinal axis therebetween. The rigid member also defines longitudinally extending uppermost and lowermost boundaries. The collar has a circumferential length and is adapted to encircle a portion of the horse and has at least one elongate flexible support member which defines a majority of the circumferential length. The flexible support member has first and second opposite ends securely fixed relative to the rigid member on opposing lateral sides of the rigid member. Each of the first and second opposite ends of the flexible support member is fixed at a longitudinal position spaced from and intermediate the first and second ends of the rigid member and at a height spaced from and intermediate the longitudinally extending uppermost and lowermost boundaries.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein:

FIG. 1 is a perspective view of a prior art anti-cribbing collar.

FIG. 2 is a cutaway top view of the lower portion of the prior art anti-cribbing collar.

FIG. 3 is a front view of the prior art anti-cribbing collar.

FIG. 4 is a perspective view of a part of the prior art anti-cribbing collar.

FIG. 5 is a cross sectional view of the prior art anti-cribbing collar taken along line 5-5 of FIG. 2.

Figure 6:
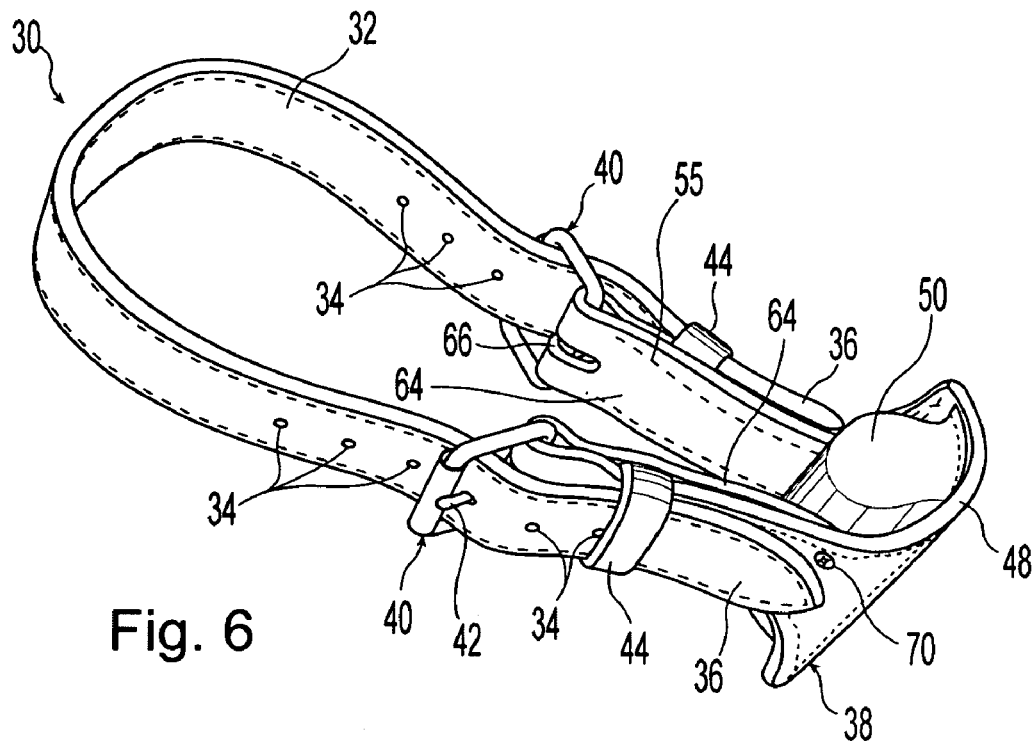
FIG. 6 is a perspective view of an anti-cribbing collar in accordance with the present invention.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 7:
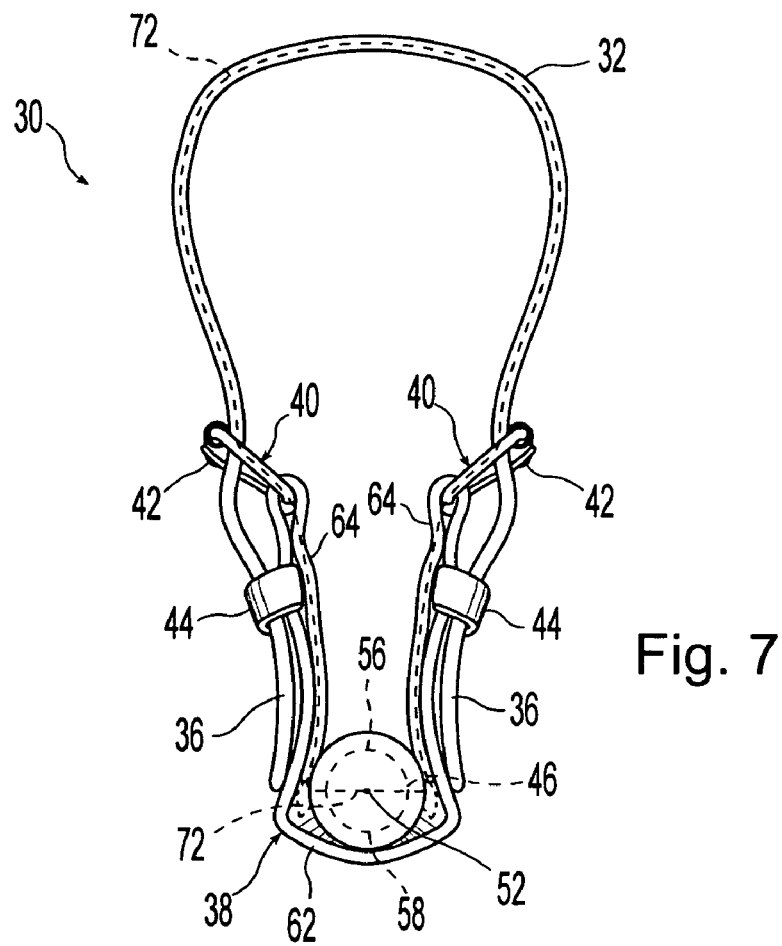
FIG. 7 is a front view of the anti-cribbing collar shown in FIG. 6.
Figure 8:
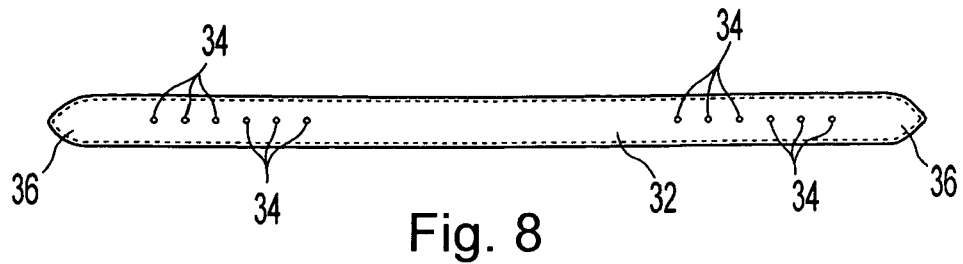
FIG. 8 is a top view of the upper strap of the anti-cribbing collar shown in FIG. 6.

A collar 30 in accordance with the present invention is depicted in FIGS. 6 and 7. Collar 30 includes an upper strap 32 (FIG. 8) which is formed out of a leather material and includes a series of spaced apertures 34 near the opposing ends 36 of upper strap 32. When collar 30 is mounted on the head of a horse (FIG. 13), upper strap 32 lies over the neck of the horse behind the ears of the animal. Opposing ends 36 of strap 32 are attached to lower collar portion 38 (FIGS. 9 and 10) which is held in the throat latch, generally adjacent and beneath the lower jaw and throat of the animal.

Lower collar 38 has two buckles 40 that are used to secure opposing ends of strap 32 to lower collar 38. Strap 32 is secured to lower collar 38 by inserting stems 42 of buckles 40 through a selected aperture 34 in strap 32 and the opposing ends 36 of strap 32 through loops 44 in the same manner that a conventional belt for securing pants on a person operates.

The circumferential length of collar 30 is adjustable by inserting buckle stems 42 through different apertures 34.

Figure 10:
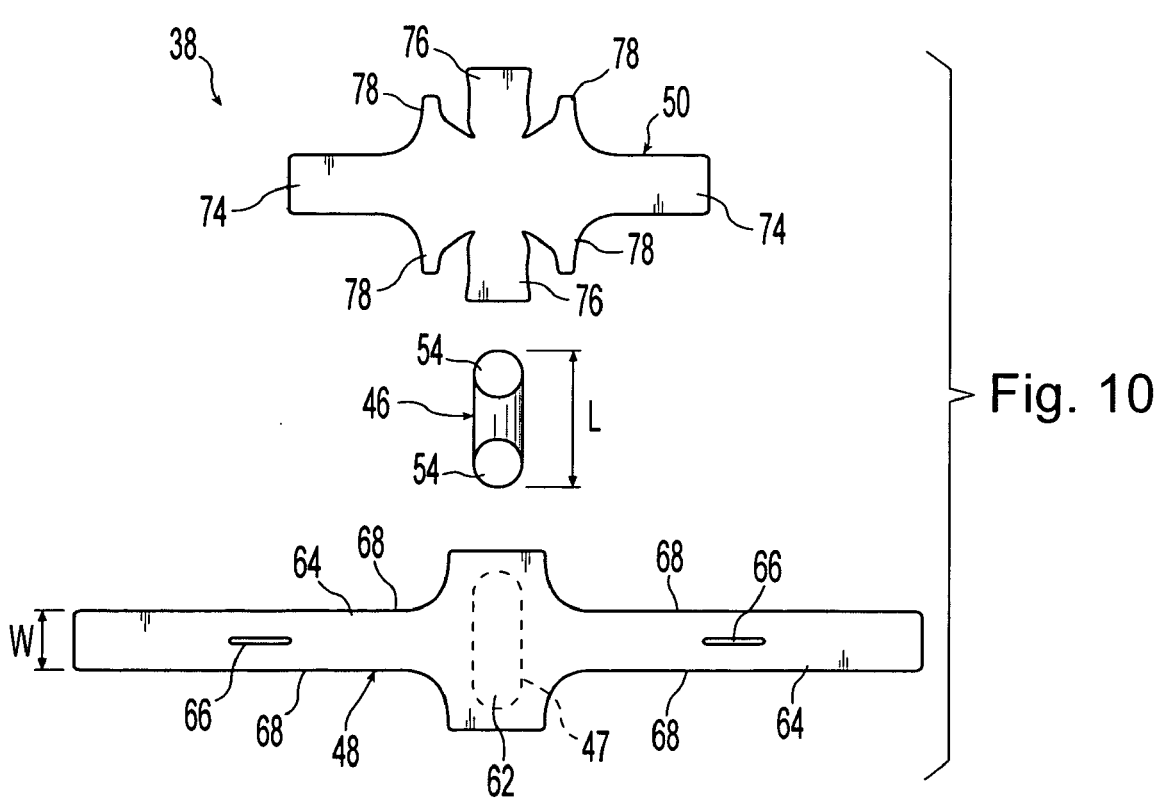
FIG. 10 is an exploded view of the lower collar component parts.

As best understood with reference to FIG. 10, lower collar 38 is formed by encasing a rigid elongate member 46 between a lower leather strap 48 and an upper leather cover 50. In the illustrated embodiment, rigid member 46 is a generally cylindrical wood rod that defines a longitudinal axis 52. Rigid member 46 has a longitudinal length L and two slanted end surfaces 54 that are cut to form an angle with axis 52. Lower strap 48 is formed out of a leather material and includes a central portion 62 and two straps 64 that extend laterally from opposite sides of central portion 62. Laterally extending straps 64 have opposing edges 68 defining a strap width W. A slot 66 is cut into each of the straps 64 for receiving the stem 42 of a buckle 40. Cover 50, also formed of a leather material, is cut to form a shape that includes two laterally extending straps 74, two central flaps 76 and four filler strips 78.

Figure 9:
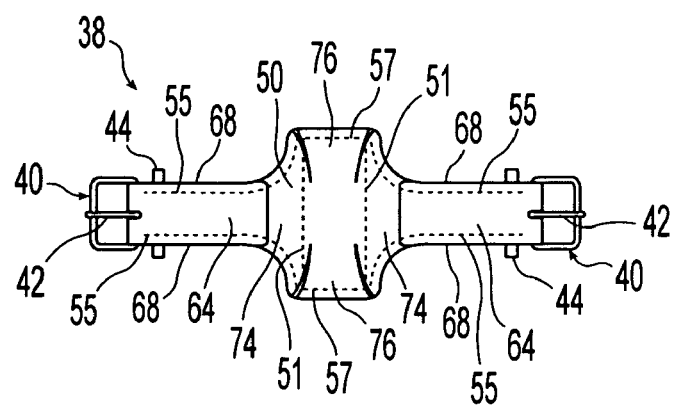
FIG. 9 is a top view of a partially assembled lower collar of the anti-cribbing collar shown in FIG. 6.
Figure 12:
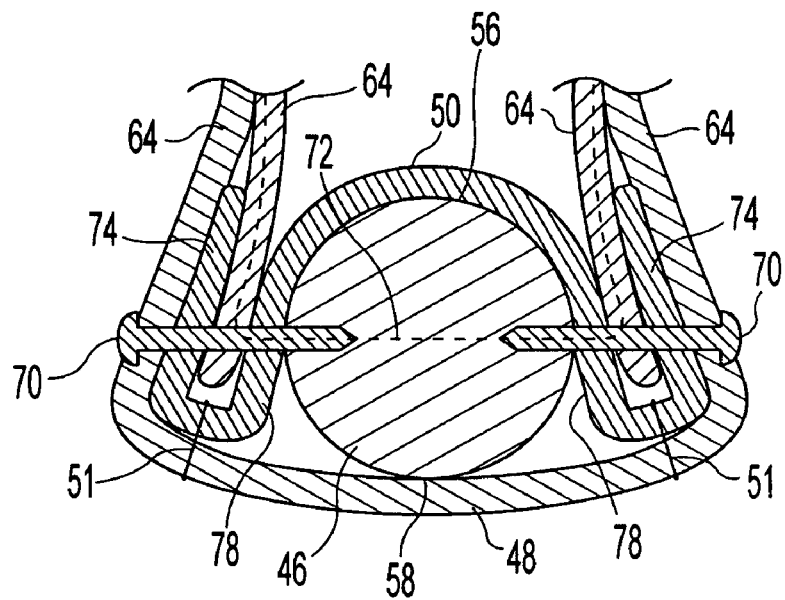
FIG. 12 is a schematic partial cross sectional view through the lower collar taken along plane 73 of FIG. 13.

To assemble lower collar 38, wooden rod 46 is symmetrically positioned on lower strap 48 in the position indicated by dashed lines 47 in FIG. 10 with end surfaces 54 facing away from lower strap 48. Upper cover 50 is then positioned on top of rod 46. When placing cover 50 over rod 46, filler strips 78 are folded and positioned adjacent lower strap 48 and along the side of rod 46 to thereby inhibit lateral movement of rod 46. As depicted in FIGS. 9 and 12, stitching 51 is provided extending generally parallel to the rod axis 52 thereby sewing together and encapsulating the rod 46 between the lower strap 48 and the cover 50. Central flaps 76 are folded so as to extend over end surfaces 54 of rod 46 and are sewn to central portion 62 of lower strap 48 with stitching 57 extending perpendicular to the rod axis 52. Lateral straps 74 of cover 50 extend along and are sewn and secured to the two opposing strap portions 64 of lower strap 48 stopping short of slots 66.

After cover 50 has been sewn to lower strap 48 trapping rod 46 therebetween, loops 44 and buckles 40 are positioned on straps 68 with buckle stems 42 extending through slots 66. As best seen in FIG. 7, straps 68 are then folded back on themselves at the longitudinal midpoint of slots 66 and sewn together for securing buckles 40 and lateral straps 74 of cover 50 between the two layers of leather formed by straps 68. Stitching 55 is similarly used to sew and secure the leather materials. FIG. 9 illustrates lower collar 38 after straps 68 have been bent/folded over and stitched together securing buckles 40, loops 44 and straps 74.

As best understood with reference to FIG. 12, the two opposing straps 64 are then folded upwardly to bring straps 64 adjacent the opposite lateral side edges of rod 46. Fasteners 70 are inserted through straps 64 to secure straps 64 to rod 46 at a point that is the approximate midpoint between the uppermost boundary 56 and lowermost boundary 58 of rod 46. As used herein, the uppermost boundary 56 of rod 46 refers to the longitudinally extending portion of rod 46 that is positioned closest to the horse when collar 30 is mounted on the horse and the lowermost boundary 58 is the longitudinally extending portion of rod 46 that is positioned farthest away from the horse and opposite boundary 56.

Figure 11:
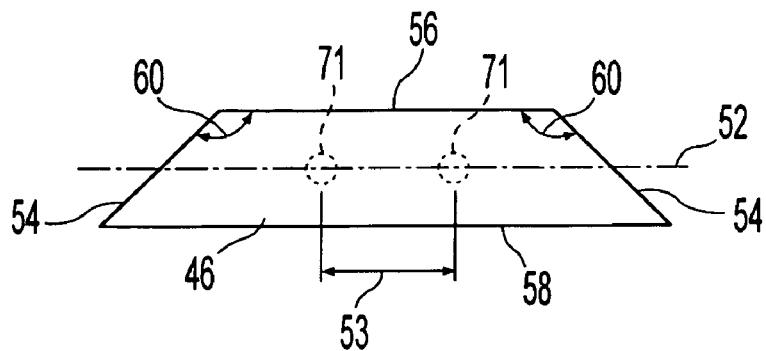
FIG. 11 is a side view of the rigid member of the lower collar.

Two fasteners 70 are inserted through each strap 64 on opposite lateral sides of rod 46 for a total of four fasteners 70. In the illustrated embodiment, fasteners 70 are conventional wood screws. FIG. 11 presents a side view of rod 46 and circular outlines 71 indicate the general location where fasteners 70 are inserted. As can also be seen in FIG. 11, end surfaces 54 form an obtuse angle 60 with uppermost boundary 56. By slanting end surfaces 54 so that they form an obtuse angle 60 with uppermost boundary 56 this junction is less sharp than if it were formed by a perpendicular angle and thereby provides a more comfortable collar for the horse.

Preferably, obtuse angle 60 is about 112.5 degrees so as to minimize discomfort to the horse. Leather cover 50 is positioned between rod 46 and the horse so that rod 46 does not directly engage the horse. Cover 50 thereby further softens the edges of rod 46 and thereby also enhances the comfort of the collar for the horse.

Figure 13:
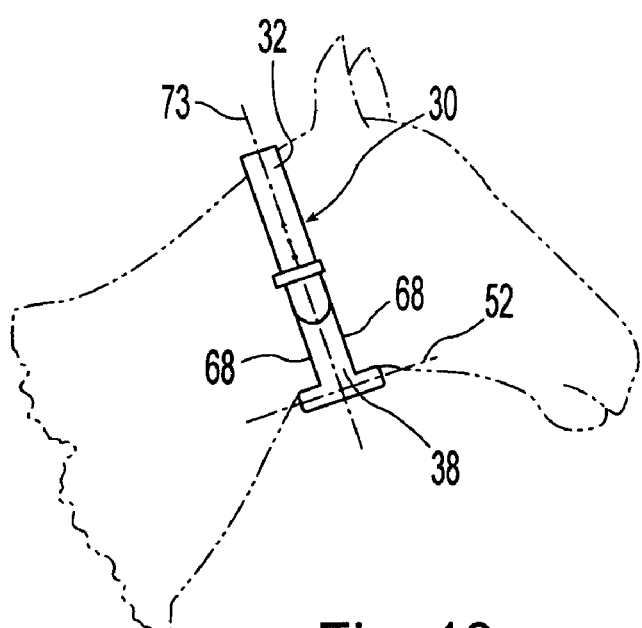
FIG. 13 is a side view of the collar shown in FIG. 6 mounted on a horse.

When collar 30 is mounted on a horse, collar 30 will encircle the neck of the horse with rigid member 46 positioned in the throat latch generally adjacent the lower jaw depression and throat of the horse with axis 52 extending in a generally front-to-back direction with respect to the horse as depicted in FIG. 13. Lateral straps 64 and upper strap 32 of collar 30 form the majority of the circumferential length of collar 30 and provide a flexible support member that extends laterally outwardly with respect to axis 52 to encircle and generally conform to the horse's anatomy. More specifically, straps 64 form two flexible support lengths that extend laterally outwardly with respect to axis 52 on opposite lateral sides of rigid member 46 and upper strap 32 forms a third flexible support length having opposing ends 36 that are detachably securable to straps 64. The circumferential length of collar 30 is selectively adjustable to fit the horse on which it is mounted by securing buckles 40 at any one of the plurality of attachment positions defined by apertures 34 in upper strap 32.

Turning more specifically to lower collar 38, straps 64 extend laterally outwardly with respect to axis 52 proximate an intermediate longitudinal location on rod 46 between and immediately adjacent the longitudinal segment 53 of rod 46 between dashed outlines 71 in FIG. 11 where fasteners 70 are located. As can be seen in FIG. 13, and understood with reference to rod outline 47 in FIG. 10, longitudinal length L of rod 46 is longer than width W of straps 64 so that rod 46 projects beyond the edges 68 of straps 64. The symmetrical design of illustrated collar 30 allows, when collar 30 is mounted on a horse, one end 54 of rod 46 to project forwardly of the front edge 68 and the other end 54 to project rearwardly of the rear edge 68.

This forward and rearward projection of rigid member 46 deters the horse from cribbing by inhibiting the horse from bending its neck into a cribbing position. It is desired, however, that rod 46 not cause discomfort to the horse when the horse is not engaging in cribbing behavior. The shape of rod 46 with slanted end surfaces 54 forming obtuse angles 60 and the use of leather cover 50 to prevent direct engagement of rod 46 with the horse both act minimize any discomfort that rod 46 might potentially cause when the horse is not engaging in cribbing behavior.

Another aspect of collar 30 that minimizes the potential discomfort associated with collar 30 when the horse is not engaging in cribbing behavior is the relatively low positioning of rod 46. As can be seen in FIGS. 7 and 12, when collar 30 is positioned on a horse, collar 30 will form a tensile loop 72 shown in dash lines along which tensile forces are transmitted. The plane in which tensile loop 72 is located is indicated by line 73 in FIG. 13 and when collar 30 is mounted on the horse, axis 52 of rod 46 will be positioned generally transverse to plane 73. It is noted that, although plane 73 is depicted as a flat plane in FIG. 13, plane 73 may have some deviations from a flat plane when collar 30 is mounted on a horse.

On the lower end of collar 30, tensile loop 72 will travel along a path between screws 70 and through or near the center of rod 46. Thus, only the upper portion of rod 46 which includes uppermost boundary 56 will lie above tensile loop 72 within the interior of loop 72 when collar 30 is mounted on a horse, and the bottom portion of rod 46 which includes lowermost boundary 58 will be located exterior and below tensile loop 72.

FIGS. 11 and 12 provide further detail concerning the connection between straps 64 and rod 46. As mentioned above, each of the opposing laterally extending straps 64 are fixed relative to rod 46 with two screws 70 located at the positions indicated by dashed lines 71 in FIG. 11. This fixes straps 64 relative to rod 46 on opposing lateral sides of rod 46 at a longitudinal position that is spaced from ends 54 and is located intermediate ends 54, i.e., between ends 54. Similarly, screws 70 secure straps 64 to rod 46 at a height that is spaced from and intermediate the longitudinally extending uppermost 56 and lowermost 58 boundaries. As a result, the longitudinal segment 53 of rod 46 which is positioned between screws 70 and thus nearest tensile loop 72 is positioned partially below the tensile loop 72. By positioning a portion of rod 46 below tensile loop 72, the rod 46 is less likely to cause discomfort to the horse when the horse is not engaging in cribbing behavior while still maintaining the rod in a position that will discourage the horse from bending its neck into a position that facilitates cribbing. Moreover, the collar 30 may be positioned relatively loose on the horse such that relatively very little discomfort is caused during normal flexing of the neck and movement of the head. However, upon movement of the head down and back toward the neck, the rod 46 will be within the throat latch causing the rod ends 54 thereof to project between the throat and under the jaws thereby causing discomfort and effectively preventing cribbing It is noted that fastening screws 70 may alternatively be secured to the rod 46 in a position extending generally perpendicularly through the straps 64 and 74 as seen in FIG. 12, and towards the rod longitudinal axis 52. In this manner, a yet larger portion of rod 46 may be located outside of and below the tensile loop 72 and away from the horse's neck so as to further minimize discomfort when the horse is not engaging in cribbing behavior, while still maintaining the rod in a position that will discourage cribbing.

The illustrated collar 30 is intended for use with quarter horses and similarly sized horses and has dimensions suitable for use with such horses. The illustrated wooden rod 46 preferably has a diameter of approximately 1.5 inches (3.8 cm), a length L of approximately 4.5 inches (11.4 cm) and an uppermost boundary 56 having a longitudinal length of approximately 3 inches (7.6 cm). The width W of straps 64 is approximately 2 inches (5.1 cm) and the longitudinal length of central portion 62 is approximately 5.5 inches (14.0 cm). While this particular configuration is well-suited for use as an anti-cribbing collar 30, the present invention may also be practiced with collars having alternative dimensions and proportions.

While this invention has been described as having an exemplary design, the present invention may be further modified within the spirit and scope of this disclosure. This application is therefore intended to cover any variations, uses, or adaptations of the invention using its general principles.

What is claimed is:

1. An anti-cribbing collar mountable on a horse, said collar comprising:

an elongate rigid member supported on said collar and defining first and second opposed ends and a longitudinal axis, said rigid member further defining longitudinally extending uppermost and lowermost boundaries, said lowermost boundary projecting beyond said uppermost boundary at each said ends;

at least one elongate flexible support member having a front edge and a rear edge, said collar having a circumferential length and being adapted to encircle a portion of the horse wherein said at least one flexible support member defines a majority of said circumferential length; and wherein said rigid member is positionable proximate a lower jaw depression and throat of the horse with said longitudinal axis extending in a generally front-to-back direction with respect to the horse when said collar is mounted on the horse and wherein said at least one flexible support member extends laterally outwardly with respect to said longitudinal axis proximate an intermediate longitudinal location on said rigid member and said first end of said rigid member projects forwardly of said front edge of said at least one flexible support member proximate said rigid member and said second end of said rigid member projects rearwardly of said rear edge of said at least one flexible support member proximate said rigid member whereby, when in use, the collar is designed to prevent cribbing.

2. The collar of claim 1 wherein said at least one flexible support member includes first and second lengths extending laterally outward on opposing lateral sides of said rigid member and a third length having opposing ends detachably securable to said first and second lengths.

3. The collar of claim 2 wherein said third length is detachably securable to each of said first and second lengths at a plurality of positions and wherein the circumferential length of said collar is thereby selectively adjustable.

4. The collar of claim 1 wherein said rigid member comprises a cylindrical rod.

5. The collar of claim 4 wherein said first and second ends of said rigid member each have an end surface disposed at an angle to said longitudinal axis whereby an intersection between said end surfaces and a longitudinally extending uppermost boundary of said cylindrical rod defines an obtuse angle.

6. The collar of claim 5 further comprising a leather cover disposed adjacent said rigid member and preventing said rigid member from directly engaging the horse.

7. The collar of claim 4 wherein said rigid member comprises a wooden rod.

8. The collar of claim 1 wherein said collar defines a tensile loop, said longitudinal axis being positioned generally transverse to a plane defined by said tensile loop and wherein a longitudinal segment of said rigid member nearest said tensile loop is disposed at least partially exterior of said tensile loop whereby said longitudinal segment of said rigid member is positioned at least partially below said tensile loop when said collar is mounted on the horse.

9. The collar of claim 8 wherein said at least one flexible support member includes first and second opposite ends securely fixed relative to said rigid member on opposing lateral sides of said rigid member, each of said first and second opposite ends of said flexible support member being fixed at a longitudinal position spaced from and intermediate said first and second ends of said rigid member and at a height spaced from and intermediate said longitudinally extending uppermost and lowermost boundaries.

10. An anti-cribbing collar mountable on a horse, said collar comprising:

an elongate rigid member supported on said collar and defining first and second opposed ends and a longitudinal axis, said rigid member further defining longitudinally extending uppermost and lowermost boundaries, said lowermost boundary projecting beyond said uppermost boundary at each said ends;

at least one elongate flexible support member, said collar having a circumferential length and being adapted to encircle a portion of the horse wherein said at least one flexible support member defines a majority of said circumferential length, said collar defining a tensile loop; and wherein said rigid member is positionable proximate a lower jaw depression and throat of the horse with said longitudinal axis extending in a generally front-to-back direction with respect to the horse when said collar is mounted on the horse with said longitudinal axis being positioned generally transverse to a plane defined by said tensile loop and wherein a longitudinal segment of said rigid member nearest said tensile loop is disposed at least partially exterior of said tensile loop whereby said longitudinal segment of said rigid member is positioned at least partially below said tensile loop when said collar is mounted on the horse whereby, when in use, the collar is designed to prevent cribbing.

11. The collar of claim 10 wherein said at least one flexible support member includes first and second lengths extending laterally outward on opposing lateral sides of said rigid member and a third length having opposing ends detachably securable to said first and second lengths.

12. The collar of claim 11 wherein said third length is detachably securable to each of said first and second lengths at a plurality of positions and wherein the circumferential length of said collar is thereby selectively adjustable.

13. The collar of claim 10 wherein said rigid member comprises a cylindrical rod.

14. The collar of claim 13 wherein said first and second ends of said rigid member each have an end surface disposed at an angle to said longitudinal axis whereby an intersection between said end surfaces and a longitudinally extending uppermost boundary of said cylindrical rod defines an obtuse angle and a leather cover is disposed adjacent said rigid member preventing said rigid member from directly engaging the horse.

15. An anti-cribbing collar for use with a horse, said collar comprising:

an elongate rigid member having first and second opposed ends and defining a longitudinal axis therebetween, said rigid member further defining longitudinally extending uppermost and lowermost boundaries, said lowermost boundary projecting beyond said uppermost boundary at each said ends; and at least one elongate flexible support member, said collar having a circumferential length and being adapted to encircle a portion of the horse wherein said at least one flexible support member defines a majority of said circumferential length, said flexible support member having first and second opposite ends securely fixed relative to said rigid member on opposing lateral sides of said rigid member, each of said first and second opposite ends of said flexible support member being fixed at a longitudinal position spaced from and intermediate said first and second ends of said rigid member and at a height spaced from and intermediate said longitudinally extending uppermost and lowermost boundaries whereby, when in use, the collar is designed to prevent cribbing.

16. The collar of claim 15 wherein said at least one flexible support member includes first and second lengths extending laterally outward on opposing lateral sides of said rigid member and a third length having opposing ends detachably securable to said first and second lengths.

17. The collar of claim 16 wherein said third length is detachably securable to each of said first and second lengths at a plurality of positions and wherein the circumferential length said collar is thereby selectively adjustable.

18. The collar of claim 15 wherein said rigid member comprises a cylindrical rod.

19. The collar of claim 18 wherein said first and second ends of said rigid member each have an end surface disposed at an angle to said longitudinal axis whereby an intersection between said end surfaces and a longitudinally extending uppermost boundary of said cylindrical rod defines an obtuse angle and a leather cover is disposed adjacent said rigid member preventing said rigid member from directly engaging the horse.

20. The collar of claim 15 wherein said rigid member comprises a wooden rod.

* * * * *